(12) United States Patent
Eardley et al.

(10) Patent No.: US 11,334,371 B1
(45) Date of Patent: May 17, 2022

(54) SYSTEMS AND METHODS FOR MULTIPLE COMPARISON CORRECTION DURING CONFIGURABLE APPLICATION FEATURE EXPERIMENTS

(71) Applicant: Split Software, Inc., Redwood City, CA (US)

(72) Inventors: Elizabeth Eardley, Edinburgh (GB); Patricio Echagüe, Redwood City, CA (US)

(73) Assignee: SPLIT SOFTWARE, INC., Redwood City, CA (US)

( * ) Notice: Subject to any disclaimer, the term of this patent is extended or adjusted under 35 U.S.C. 154(b) by 0 days.

(21) Appl. No.: 17/491,854

(22) Filed: Oct. 1, 2021

(51) Int. Cl.
*G06F 9/44* (2018.01)
*G06F 9/445* (2018.01)
*G06F 11/34* (2006.01)

(52) U.S. Cl.
CPC ...... *G06F 9/44505* (2013.01); *G06F 11/3495* (2013.01)

(58) Field of Classification Search
CPC .................................................. G06F 9/44505
USPC ......................................................... 719/320
See application file for complete search history.

(56) References Cited

U.S. PATENT DOCUMENTS

| 10,152,458 | B1 * | 12/2018 | Stepaniants | ........ G06Q 30/0242 |
| 2014/0214896 | A1 * | 7/2014 | Hotta | .................. G06F 16/2471 707/770 |
| 2020/0150949 | A1 * | 5/2020 | Jewkes | ............... G06F 11/3438 |

* cited by examiner

*Primary Examiner* — Timothy A Mudrick
(74) *Attorney, Agent, or Firm* — Womble Bond Dickinson (US) LLP

(57) ABSTRACT

A method and apparatus for configurable application feature experiments is described. The method may include receiving a set of metrics to be collected after a feature treatment is deployed to configurable applications executed by a plurality of end user systems, a significance threshold for detection of feature treatment impact on one or more metrics within the set of metrics, and a request to perform multiple comparison correction when detecting the feature treatment impact. The method may also include receiving, from the configurable applications, event messages that include metric values associated with the set of metrics. Further, the method may also include performing a statistical analysis of the metric values to determine whether the feature treatment caused a statistically significant change in values associated with one or more of the metrics, where the statistical analysis adjusts one or more parameters used to perform the statistical analysis based on a multiple comparison correction analysis.

20 Claims, 6 Drawing Sheets

SYSTEMS AND METHODS FOR MULTIPLE COMPARISON CORRECTION DURING CONFIGURABLE APPLICATION FEATURE EXPERIMENTS

TECHNICAL FIELD

Embodiments of the invention relate to the field of software application development and deployment, and more particularly, to distributed software feature experimentation.

BACKGROUND

Software applications, such as web page based applications, mobile device applications, desktop computer system applications, etc., are created by software developers. The software applications are then distributed to end users and run on end user computer systems (e.g., run on a user's personal computer, mobile computing device, served to a user from a web server, etc.). From usage of a software application, a developer may determine that changes to the application are necessary and/or desired for various reasons. For example, a software application may contain a bug causing the application to act in undesirable or unforeseen ways, and may even prevent the software application from running. As another example, a developer may want to change a user interface element based on experiences and/or feedback of real world users of the application. As yet another example, a software application update intended to allow a real world user to improve service bookings may actually result in fewer service bookings. As yet another example, a new version of a web page may be intended to decrease page load time, when in fact it increases page load time. Thus, the effectiveness of the application in terms of operational performance and user experience may influence updates to the application.

Software applications, however, are becoming increasingly complex in terms of the number and characteristic of user interface elements, user interface layout, functional elements, options that may be deployed in an application, different deployments to various user groups, as well as other application implementation elements that may impact user experience with an application. Thus, measuring whether an update, potentially containing several new features (e.g., layout changes, feature changes, additional/new elements, etc.) and/or different version deployed to different groups (e.g., a mobile user group, a geographic user group, a specific customer base, etc.), is effective in terms of operational performance and/or application performance metrics is also increasingly difficult. Furthermore, when multiple metrics are measured simultaneously during deployment of one or more new and/or updated application features, the potential for error in the analysis of the impact on the metrics attributable to the new and/or updated application features increases to an unacceptable level. Thus, testing of the deployment of new and/or updated application features is inefficient and often not sufficiently accurate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
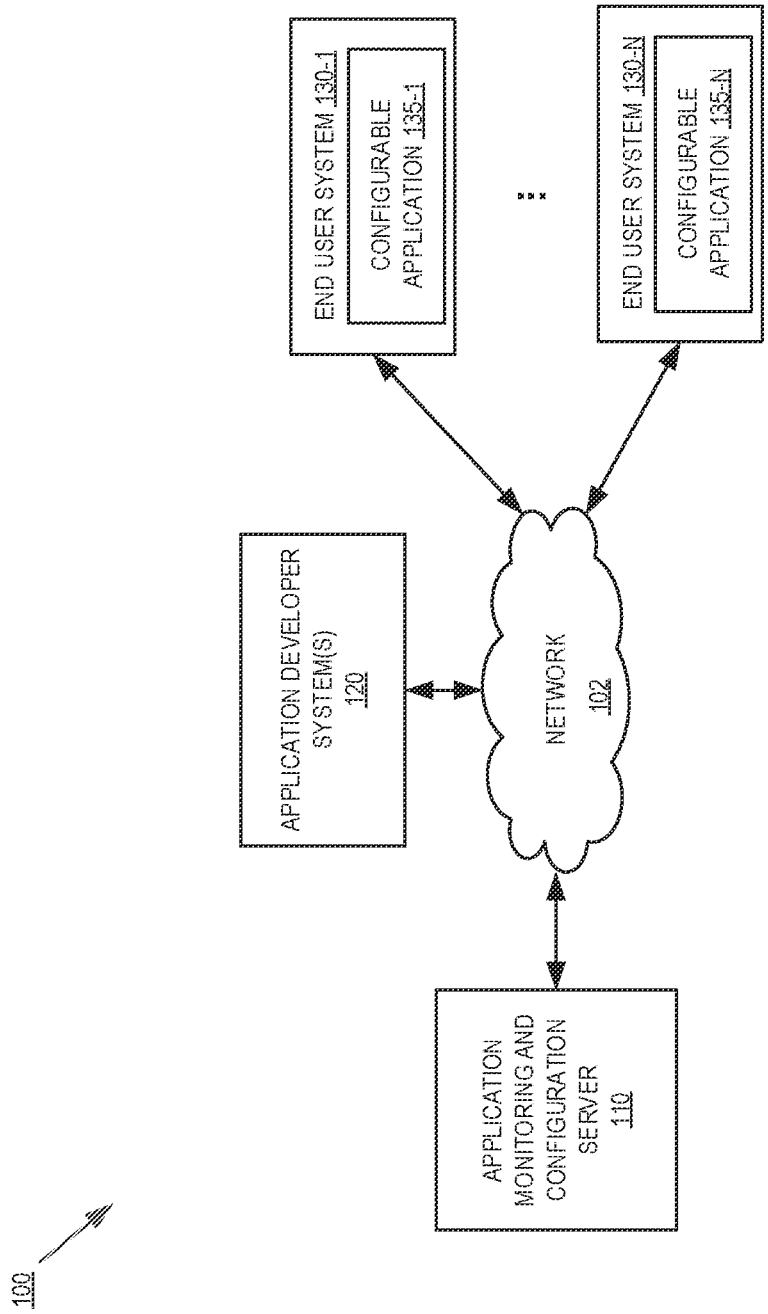
FIG. 1 is a block diagram of an exemplary system architecture for providing multiple comparison correction during configurable application feature experimentation.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "associating", "determining", "performing", "generating", "executing", "adjusting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing multiple comparison correction during configurable application feature experimentation.

In one embodiment, the system 100 includes a plurality of user systems, such as end user system 130-1 to user system 130-N, application monitoring and configuration server 110, and application developer system(s) 120. In one embodiment, end user system 130-1 to user system 130-N may be personal computing devices, such as a desktop computer, laptop computer, tablet computer, mobile computing device, mobile communication device, wearable devices, gaming devices, medical devices, or other computer systems upon which configurable applications 135-1 to 135-N may be run. The application monitoring and configuration server 110 and application developer system(s) 120 may also be computing devices, such as one or more server computers, desktop computers, etc.

The end user systems 130-1 through 130-N, application monitoring and configuration server 110, and application developer system(s) 120 may be coupled to a network 102 and communicate with one another using any of the standard protocols for the exchange of information. In embodiments, secure protocols for the exchange of information may also be used. In one embodiment, one or more of the end user systems 130-1 through 130-N, application monitoring and configuration server 110, and application developer system(s) 120 may run on one Local Area Network (LAN) and may be incorporated into the same physical or logical system, or different physical or logical systems. Alternatively, the end user systems 130-1 through 130-N, application monitoring and configuration server 110, and application developer system(s) 120 may reside on different LANs, wide area networks, cellular telephone networks, etc. that may be coupled together via the Internet but separated by firewalls, routers, and/or other network devices. In yet another configuration, the application monitoring and configuration server 110 and application developer system(s) 120 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, end user systems 130-1 through 130-N execute applications, such as configurable applications 135-1 through 135-N. The configurable applications may include any type of software application such as an application downloaded to, installed on, and run on a user system, a web based application downloaded from a server computer system and run on a user system, a mobile application where the user system is a mobile device (e.g., tablet computer, laptop computer, mobile telephone, gaming device, medical device, etc.), as well as other types of software applications. Configurable applications 135-1 through 135-N may be configured at run time using application monitoring and configuration server 110 to control how one or more features are treated during execution of the application. For example, a feature may be turned on or turned off by application monitoring and configuration server 110 for execution by one or more user systems 130-1 through 130-N, such as activation of a user interface element, activation of an application capability, etc. As another example, a value may be set by application monitoring and configuration server 110 within an application that impacts how the application is executed by an end user system, such as specifying between different credit cards that can be accepted in a merchant user interface of the application, specifying a user group (e.g. based on device type, demographics, operating system, etc.) to receive a banner ad in a web page, as well as any other type of application configuration. As yet another example, appearance of a user interface may be altered by application monitoring and configuration server 110. In embodiments, the different real-time configurations of running applications are referred to herein as treatments, where a treatment configures one or more application features during the execution of software applications by end user systems. Furthermore, each of user systems 130-1 through 130-N may execute the same or different applications having the same and/or different treatments applied by application execution management server 110. For example, different subsets or populations of end user systems 130-1 through 130-N may have different treatments applied to their respective configurable applications 135-1 through 135-N during treatment efficacy experimentation, as discussed herein. For ease of discussion, and to avoid obscuring embodiments set forth herein, the remaining discussion will assume that the configurable applications 135-1 through 135-N are the same type of application even if they have different treatments being applied.

In one embodiment, configurable applications 135-1 through 135-N are prepared for management by application monitoring and configuration server 110 by a developer of the application, such as by a developer associated with application developer system(s) 120. In one embodiment, a user of application developer system(s) 120 includes a feature treatment logic within each application 135-1 through 135-N. Optionally, a user of application developer system(s) 120 may configure the application to communicate with a software development kit (SDK) (not shown) that is either within each application 135-1 through 135-N or remotely located at, for example, application developer system(s) 120, a web server (not shown) providing the application of developer system, etc. The SDK and documentation for inserting the feature treatment logic within the code of an application may be downloaded from application monitoring and configuration server 110. In embodiments, the SDK is a software development tool responsible for communicating with application monitoring and configuration server 110 on a periodic basis, such using functions and protocols defined by an application programming interface (API) of application monitoring and configuration server 110, for sending and receiving electronic messages over network 102 to enable acquiring definitions that enable the feature treatment logic with applications to select between configurable application features based on, for example, end user system identifiers, user identifiers, or other identifiers, and logic within the application's code for executing a feature specified in the acquired definitions and transmitting reports messages to application monitoring and configuration server 110. Application developer system(s) 120 insert the feature treatment logic into the applications to enable runtime configuration of application features, such as the ability to selectively enable features, selectively change execution of features, selectively turn features on/off, selectively change a user interface and/or the elements contained therein, etc. One embodiment of providing for and configuring the execution of applications with different treatment(s), selectively and in real time using feature treatment logic, is described more fully in U.S. patent application Ser. No. 15/198,498, titled "Systems and Methods for Providing Control of Application Execution", file on Jun. 30, 2016, which is incorporated herein by reference in its entirety.

In embodiments, application developer system(s) 120 may assign application(s) 135 and/or end user systems 130 with unique user identifiers, such as a user key. In embodiments, the user key(s) may be provided to application monitoring and configuration server 110 from application developer system(s) 120, so that application developer system(s) 120 can specify how to identify specific end users and then which end users are to receive which treatments. Furthermore, the user key maintains the privacy of users of the customer, as private and/or personally identifying information is not shared with application monitoring and configuration server 110.

In embodiments, application developer system(s) 120 may provide user attributes that are associated with user keys, for example in a user data store (e.g., user data store 216), such as age, geographic region, gender, income bracket, operating system, device type, etc. This enables application developer system(s)(s) 120 the ability to test software features at end user systems 130-1 through 130-N on a select basis, for example by activating a feature on a specific user (e.g., by user key), a select group of user systems (e.g., subsets or populations of user's having a specific attribute or combination of attributes), to roll out a feature in newly released applications slowly over a set period of time to select user groups and/or users of the same group, to turn off features that are not behaving as expected, etc.

In one embodiment, application developer system(s) 120 further insert event tracking method calls in one or more of configurable applications 135-1 through 135-N. In embodiments, the event tracking method calls may also be inserted into software executing on application developer system(s) 120 and/or external application developer systems (not shown), such as systems providing web based services software, customer resource management software systems, remote data warehouses, enterprise resource planning software systems, active policy management software systems, security information and event management software systems, and/or other software systems used by application developer system(s) 120 that provide software and/or services to end user system(s) 130-1 through 130-N. In embodiments, the method calls are provided by the API distributed by application monitoring and configuration server 110, which may be inserted into and executed by software applications 135-1 through 135-N, as well as applications executed by application developer system(s)(s) 120 and external application developer system(s) 140.

In one embodiment, event tracking method calls, when made, generate a message that includes at least a customer key (e.g., a customer identifier) that enables application monitoring and configuration server 110 to distinguish between different customers (e.g., corporation X and corporation Y), a user key (e.g., a traffic type that identifies one or more users and/or characteristics of users of the customer, such as specific user IDs, class of user, a type of account associated with the user, etc.), an event type that identifies the event being tracked, value(s) associated with one or more metrics for the event (e.g., page load time, time on page, feature exposure, occurrence or non-occurrence of a booking, occurrence or non-occurrence of a sale, number of interactions with a feature, etc., or a combination thereof), a timestamp indicative of when the event triggering the method call occurred, and, in some embodiments, a set of one or more optional properties like user location, gender, demographic information, and any other type of data that can be used to segregate or otherwise differentiate the set of these events at a later time for more fine granular analysis using the techniques discussed herein. For example, the event tracking method call may be triggered in response to a user clicking a buy button on a web based application, a booking is initiated in a mobile app, a user selects a credit card in an application, a user navigates to a specific web page, etc. (e.g., active events with respect to a user interacting with an application), and may also be triggered when a user leaves a specific page of an application or web application, time a frame in an application or web page is displayed, a method call in response to completion of a specific event (e.g., page load time), etc. (e.g., passive events with respect to a user's interactions with an application), where the track method call is included in the code for the application feature being tracked. In embodiments, the method call within the application generates a message including the above described information (e.g., customer key, user key, event type, and value of a metric (if applicable)) and is transmitted to application monitoring and configuration server 110. In one embodiment, the message may be encrypted or otherwise secured to obfuscate the information contained herein. However, as discussed herein, the identifiers do not reveal personal user information, and are instead used by application developer system 120 to associate with the customer's users.

One embodiment of the track events method call, may be a method call, such as track( ) defined in an SDK or API distributed by application monitoring and configuration server 110 and integrated into configurable applications 135-1 through 135-N, which may take four arguments. For example, the track( ) method call may be able to pass to application monitoring and configuration server 110 a customer_ID (e.g., an identifier that represents the customer system, such as an application developer system 120 that distributed configurable applications to end user systems), a traffic_type (e.g., a string that represents an end user system and enables application developer system(s) 120 to identify specific users, groups of users, etc., such as a user ID, account ID, customer type including fee or paid, etc.), an event_type (e.g., a string that represents an event type corresponding to the event that resulted in the track( ) method call), and one or more value(s) (e.g., optional value(s) that may be defined to represent a value or metric to be tracked, which can be set to null or zero in the event application monitoring and configuration server are to count occurrences of an event, and/or which can represent user location, gender, demographic information, and any other type of data used for fine granular analysis of applications). Furthermore, the execution of the track( ) method call may also generate and attach a timestamp to the event message. For example, a track( ) method call may take the form of client.track("Customer_ID", "Trafic_Type", "Event_Type", Value), with example values of client.track ("john@doe.com", "user", "page load_time", 83.3334). In embodiments, however, other fields/arguments may be used consistent with the discussion herein for tracking and describing events that occur in response to application of different application treatments.

In embodiments, when event tracking method calls are integrated into features of configurable application(s) 135-1 through 135-N, software running in application developer system(s) 120, and/or software running in external application developer system, application monitoring and configuration server 110 aggregates a plurality of received event messages, and stores the event messages in a data store (e.g., User Data Store 216 illustrated in FIG. 2) by customer key, user key, or any other key, along with the data (e.g. timestamps and other data) from the event messages that enable application monitoring and configuration server 110 to store, locate, and sort event information records. In embodiments, the event messages may be generated from method calls embedded within feature treatments that have been activated in a configurable application. However, event messages may also be generated from method calls in other software components or systems. For example, an event tracking message may be used within a feature's selected treatment to indicate when the user is accessing the treatment or a function within a treatment. As another example, a feature treatment may be designed to improve sales conversions, and the method call is associated with a buy button that is not part of the configurable aspects of the application. As yet another example, an external customer system (not shown), such as a customer relationship management (CRM) system, may use a track event method call when a new contact is added to the CRM system. As yet another example, an event tracking message may be generated automatically upon the occurrence of events by a configurable application, such as automatically generating messages with application metrics for page load time, time on page, error messages, etc., such as by using an agent, function, or other mechanism within the application or webpage based application. As discussed herein, even though one or more of the received event messages are not connected to the execution of the configurable application, they may be relevant to a developer system 120 when determining effectiveness of a treatment with an application. Therefore, the use of the track( ) method calls discussed herein enables the tracking and attribution of events from a more diverse set of systems to improve how relevant events are attributed to feature treatment application at one or more of end user systems 130.

In one embodiment, after aggregating the plurality of events from the various systems from the received event tracking messages, application monitoring and configuration server 110 performs event attribution on the collected corpus of reported events from end user systems(s) 130-1 through 130-N and other software systems that have integrated the tracking techniques discussed herein, where event attribution is described more fully in U.S. patent application Ser. No. 16/681,207, titled "Systems and Methods for Providing Event Attribution in Software Applications", file on Nov. 12, 2019, which is incorporated herein by reference in its entirety. In embodiments, event attribution links events (e.g., from event messages from any source system) with feature treatments applied in a configurable application. The link is established by the application monitoring and configuration server 110 using one or more of the customer key and/or user key, and time stamps in the event messages based on a time when a feature treatment is activated. That is, metric values for specific metrics measured for events (e.g., page load times, clicks, views, buys, feature treatment access, etc.) that occur after a user (e.g., an end user of one of end-user systems 130) received a treatment for a configurable application may be linked/attributed to the feature treatment. Furthermore, because feature treatments may be organized based on any number of end user attributes (e.g., one or more of age, geography, income bracket, user class, gender, profession, etc.), different sample sets or populations may be generated for deploying different feature treatments in different time periods to, for example, roll out features slowly, test feature treatments for specific user groups, etc. The attribution of events to feature treatments, and further based on sample sets, are then used by application monitoring and configuration server 110 to determine, using statistical inference, whether an event was influenced in a causal manner by a feature treatment based on the metric values and event types within the event messages from the different populations/subsets of end users. For example, activating a variant of feature treatment x resulted in a statistically higher sales conversion for users belonging to group y. As another example, activating a variant of feature treatment i resulted in a statistically longer page load time for users belonging to group j. As yet another example, an event triggered on an external system (not shown) is statistically more likely to happen for users in group a exposed to feature treatment b.

In one embodiment, statistically significant degradation of a metric attributed to feature treatments and/or statistically significant improvement of a metric may be used to generate alert messages (e.g., email messages) for the user of application developer system 120. The alert messages, as discussed herein, give early notice to application developer system(s) 120 when a feature treatment is having the opposite of desired impact, or conversely the desired impact, on one or more metrics being measured by the configurable application 130 at end user system(s) 130-1 through 130-N. Thus, a user of application developer system(s) 120 is able to determine, through experimentation by deployment of configurable applications, selectively activating feature treatments, and monitoring whether metrics are impacted in statistically meaningful ways by feature treatments, to improve the performance of the configurable applications with respect to the metrics.

In embodiments, the alerts, feature treatments, metrics and/or sets of different metrics associated with the statistical analysis may be configured by a user of an application developer system 120. In one embodiment, because events include application developer system 120 defined values and event types, the values and event types are typically associated with key performance measurements of the developer (e.g., sales conversions, service bookings, time on page, page load times, application memory usage, etc.). Therefore, the statistical evaluation of the metric values in the event messages for the relevant event types, and the determination that a feature treatment is determined to have an impact on one or more metrics being tested to a statistical significance, is based on the attribution performed by application monitoring and configuration server 110 to enable application monitoring and configuration server 110 to generate alerts, user interfaces detailing application performance during experimentation (e.g., in response to feature treatments), suggestions to roll back (or kill) a feature deployment transmitted to relevant users of application developer system(s) 120, and/or automatically configure an application's treatment variations with respect to those key performance measurements, such as when it is determined that a metric is statistically likely to have degraded/improved by at least a threshold amount. In one embodiment, alerts may be generated in messages (e.g. email, text, etc.), graphical user interfaces, or a combination when metric degradation is detected by application monitoring and configuration server 110. Beneficially, the notifications, recommendations, and automatic application configuration are based on the specific features and metrics that are relevant to the customer system. In other words, feature level insights are used to determine what is impacting a metric of interest to a developer system 120. Application developer system(s) 120 may use the information to determine which versions (e.g., which treatment or collection of treatments), which specific features, etc. for an update to an application are failing to meet key performance goals at a granular level beyond mere knowledge that an application is not behaving as expected. The application developer system(s) 120 user(s) are then able to more quickly and more accurately address the issues causing unwanted application performance degradation.

In one embodiment, the statistically significant detection of a metric's degradation or improvement for feature treatments may also be used by application monitoring and configuration server 110 to actively configure additional end user systems. That is, when application monitoring and configuration server 110 detects that a feature treatment is statistically likely to be causing performance degradation of one or more key metrics by at least a threshold amount (e.g., page load time greater than 10%, page load time greater than 100 ms, page view decrease, sales conversion decease, etc.), in embodiments, application monitoring and configuration server 110 can proactively and automatically without intervention of a user of application developer system(s) 120 apply a baseline feature treatment (e.g., a treatment applied before the degradation, a treatment associated with a control group, etc.) that did not result in degradation of the metric. Similarly, if improvement of those metrics exceeds a threshold, the feature treatment deployment may be increased to additional user(s) and/or groups of user(s). Additionally, external systems may be notified and/or configured based on the detected degradation/improvements, such as issuing commands or request notifications to activate a software development system bug tracking system (e.g., in response to an increase in page load errors), issuing commands or request notification to configure computing resources (e.g., in response to increased or decreased usage, requesting, commanding, or otherwise configuring server systems to appropriately decrease, increase, or other otherwise adjust allocated resources), etc. Therefore, real time testing and analysis enables application monitoring and configuration server 110 to determine in real time when an application feature is degrading key metrics set by a developer system 120, and further how to alert and automatically remedy the degradation with granular feature level insights. Techniques for determining when a feature treatment has a statistically significant impact on a metric is discussed more fully in U.S. Pat. No. 10,936,462, titled "Systems and Methods for Providing Event Attribution in Software Applications", issued on Mar. 2, 2021, which is incorporated herein by reference in its entirety.

Because decisions impacting feature deployment, feature rollout, feature rollback, determination of effectiveness of software application changes, etc. are of great importance to the users of application developer system(s) 120, it is therefore important that those decisions be based on accurate information. More specifically, and typically, multiple metrics and their associated values will be collected during an experiment involving a feature treatment experiment. When the statistical significance of the metrics of those features are simultaneously collected to determine an impact of a feature treatment, an error is accumulated in the statistical inferences from the multiple metrics and thus reduces the determined accuracy of impact on individual metrics. The accumulated error over a set of metrics can be a family wise error rate (e.g., the probability of getting at least one falsely significant metric) or a false discovery rate error (e.g., the expected proportion of falsely significant metrics among the set of significant metrics). Since these types of errors accumulate when simultaneously measuring multiple metrics, feature treatment experiments that test multiple metrics become less accurate. For example, if a significance threshold is set to 0.05 (e.g., a 5% chance that an impact caused by the treatment will be falsely attributable to the metric) for 100 metrics being measured during a feature treatment experiment, error is accumulated over the 100 metrics due to the analysis of the metric values simultaneously. As a result, the likelihood of falsely attributing a statistically significant impact of one or more metric values' changes due to the feature treatment increases, to for example about 99. Thus, if a developer is to make important decisions such as whether or not to roll out an application feature based on the metric value analysis, they may be relying on inaccurate information since there is a 99% chance that the analysis would determine at least one metric was statistically influenced by the feature treatment regardless of the true impact of the application feature. For example, when the developer is testing an application feature which has no true causal impact whatsoever on any of their 100 metrics, the analysis would, with 99% likelihood, determine at least one metric to be statistically influenced by the feature treatment. This may lead to wasted development time, incorrectly deploying features that do not improve application performance, decreased application efficiencies, etc.

To address the aforementioned problems, in embodiments, application monitoring and configuration server 110 performs multiple comparison correction when an experiment involving a feature treatment involves the simultaneous reporting and measurement of two or more metric values (e.g. a combination of page load time, memory usage, click through, time on page, sales conversion, etc.). In an embodiment, each metric which is determined to be statistically influenced by the feature treatment is treated as a discovery. That is, when a metric value is determined to have been impacted by a statistically significant amount by a feature treatment, it is considered a discovery of a causal relationship between the metric value and the feature treatment. When each metric value measured in an experiment is analyzed to determine whether there is a statistically significant impact caused by a feature treatment, then in embodiments, a multiple comparison correction procedure can be applied to control the accumulated errors (e.g., control family wise error rate or false discovery rate accumulated errors) across metrics. In an embodiment, the multiple comparison correction applies a false discovery rate control procedure to the statistical analysis of feature treatment impact on reported metric values during an experiment. In embodiments, a Benjamini-Hochberg procedure, a Benjamini-Yekutieli procedure, Storey's q-value procedure, a local false discovery rate procedure, a positive false discovery rate procedure, or other false discovery rate control procedure, may be applied to detect how statistical inference parameters should be adjusted for each individual metric to reduce the accumulated error to arrive at an overall false discovery rate corresponding to the originally developer defined significance threshold. That is, using the example discussed above, the accumulated family wise error rate of 99% for falsely attributing at least one metric value's change to a feature treatment is reduced through a correction made by the false discovery rate control process so that the resulting accumulated false discovery rate error will not exceed a user-defined significance threshold of, for example, 5%. In embodiments, the false discovery rate control procedure uses the collected testing results and adjusts the p-values resulting from the analysis of each metric on a per-metric factor. The adjustment factor may then be used to reapply the null-hypothesis testing with p-values adjusted by corresponding adjustment factors to control the accumulated error or overall false discovery rate to the original significance threshold. Furthermore, the adjustment factor is also applied on a per metric value basis to additional testing parameters including error margins and confidence intervals to ensure consistency with the p-value adjustment. However, the adjusted testing parameters and results ensure that the rate of false discovery does not exceed the original user defined significance threshold, so that the user may be ensured of their results.

In embodiments, the process of adjustment based on the multiple comparison correction is time based. That is, in embodiments, each time a set of metric values is corrected, the false discovery rate procedure is re-performed because it relies on the collection of the values, which may change over time during an experiment of feature treatment(s). Thus, the multiple comparison correction applied, adjustment factors obtained, and adjustments to testing parameters made, are also applied in a time series corresponding to when testing results are generated (e.g., hourly, daily, weekly, etc.). Additionally, and as discussed below, the time based approach enables metrics to be excluded when there is an insufficient number of observations (e.g., 100 observations, 300 observations, 500 observations, 2,000 observations, etc.). The number of observations required for sufficiency may be a predetermined observation sufficiency threshold value. For example, a metrics subset collected for a feature treatment experiment may include metrics M1, M2, and M3. However, M3 could be excluded at a certain point in time (Ti) because it does not have a sufficient number of observations satisfying the observation sufficiency threshold value. Thus, in embodiments a multiple comparison correction procedure is applied to M1 and M2 at time Ti. However, at time Tj (j>i), when the number of observations of M3 does satisfy the observation sufficiency threshold, it can be included and the multiple comparison correction procedure applied to M1, M2, and M3. Beneficially, because the magnitude of correction applied depends on the number of metrics, by excluding M3 at that first time Ti, the correction applied to metrics M1 and M2 does not need to be as large.

In embodiments, after adjustment and application of the adjusted testing parameters, which apply multiple comparison correction to control false discovery, application monitoring and configuration server 110 may generate one or more graphical user interfaces (GUI(s)) with the application feature treatment experiment results based on the adjusted testing parameters. The GUI(s) may then be transmitted to application developer system(s) 120 for display of the metrics that have been measured, the impacts of a feature treatment on those metrics, and in embodiments, an indication that multiple comparison correction was performed. Furthermore, because of the time-series nature of the adjustment, in embodiments, the adjustments and their values may be rendered over time to show their change, control which metrics are included in a multiple comparison correction procedure to ensure minimal adjustment of original experimentation parameters, as well as the adjustment to parameters made at each time interval. Additionally, in embodiments, the automatic actions, such as automatically rolling back feature deployment, killing a feature having an impact on a metric satisfying an automatic action threshold, etc. may also be based on the adjusted values to ensure that automated actions also use the adjusted and accurate values, as well as trends over time.

Figure 2:
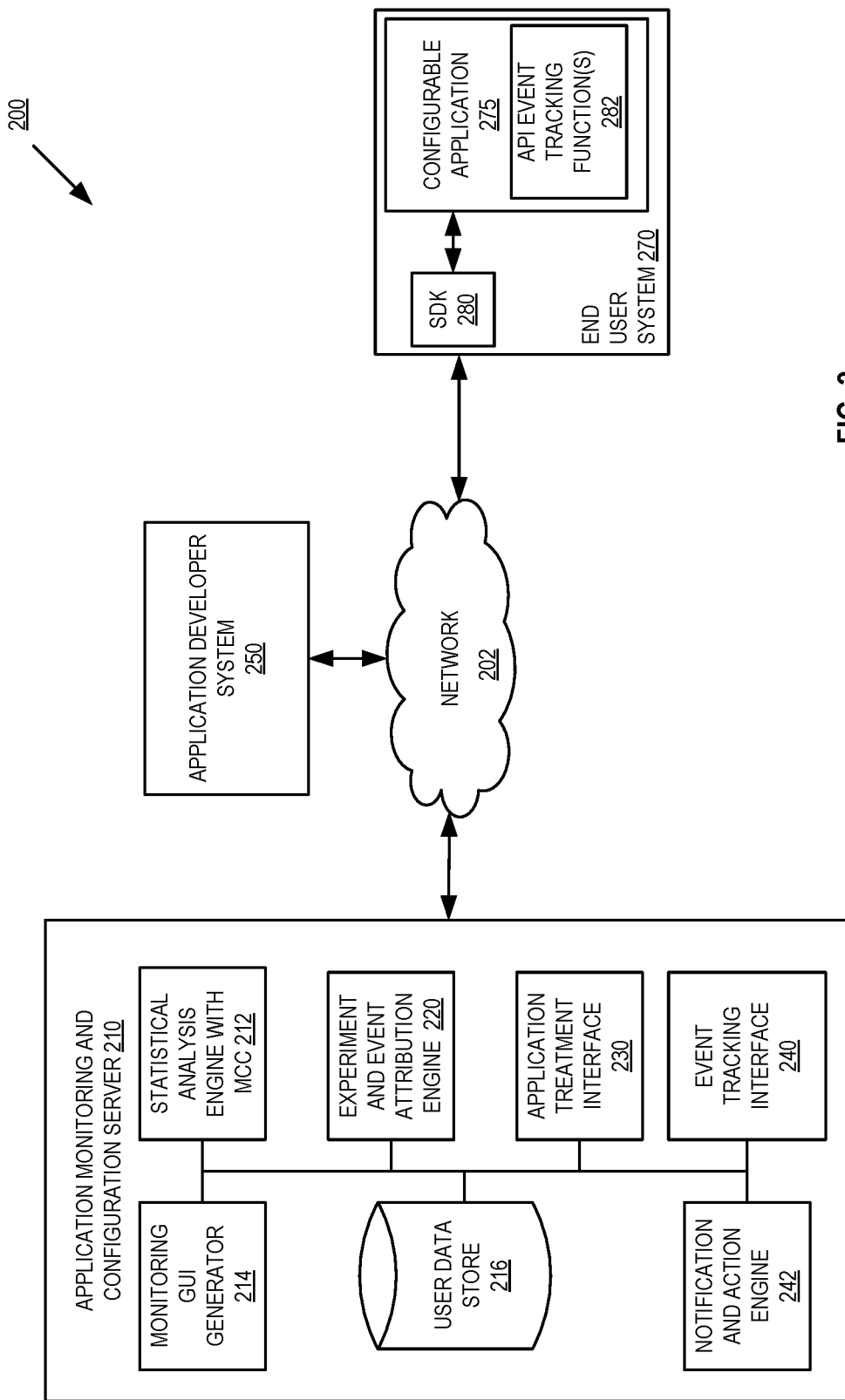
FIG. 2 is a block diagram of one embodiment of an application monitoring and configuration server, an application developer system, and end user systems.

FIG. 2 is a block diagram of one embodiment 200 of an application monitoring and configuration server 210, end user system, and an application developer system 250. The systems illustrated in FIG. 2 provide additional details for the systems discussed above in FIG. 1. Furthermore, although only one application developer system 250 and one end user system 270 are illustrated, any number of such systems maybe used for feature treatment experimentation with multiple comparison correction, such as any number of different developer systems and their respective end user systems.

In one embodiment, application monitoring and configuration server 210 includes a statistical analysis engine with multiple comparison correction (MCC) 212 for performing statistical analysis on metrics collected from events that have been attributed to feature treatments for users/user groups, and adjusting how those statistical results are determined to ensure the accumulated error does not exceed a developer defined significance threshold. In embodiments, as discussed herein, the statistical analysis performed by statistical analysis engine 212 detects statistically relevant movement (e.g., improvement and/or degradation) of metrics to detect statistically significant impacts to metrics caused by features and treatments deployed to configurable application 275 during experiments.

Application monitoring and configuration server 210 further includes graphical user interface (GUI) generator 214 for generating user interfaces for configuring significance threshold value(s) as well as for generating alert user interfaces, user data store 216 for storing events with associated event data and treatments/impressions data, experiment and event attribution engine 220 for attributing event messages from both end user systems and external systems to treatment variations during experiments, application treatment interface 230 for distributing treatment configurations to end user system 270 as specified by application developer system 250 or based on an orchestrated experimentation, event tracking interface 240 to distribute event tracking method call APIs and receive event messages for storage of the event messages and event message data in user data store 216, and notification and action engine 242 for generating notifications and/or automatically re-configuring configurable applications based on adjusted MCC-based analysis results of the statistical analysis engine 212.

End user system 270 includes a configurable application 275 capable of receiving feature treatment configuration data and selectively applying feature treatments, an optional software development kit (SDK) 280 for receiving the feature treatments, and API event tracking functions 280 such as event tracking method calls (discussed above) defined by an API of application monitoring and configuration server 210. In embodiments, the method calls in API event tracking functions 282 may or may not be part of a configurable feature within application, as defined by a developer associated with application developer system 250 includes the method calls within the application.

External application developer systems (not shown), such as a data warehouse, CRM system, policy system, etc., may also include API event tracking functions that a developer has associated with application developer system and has included the method calls for generating event messages within the application being executed at external application developer system Application developer system 250, in embodiments, distributes the configurable application 275 to end user system 270 directly, or through a third party (not shown) such as an application store. Furthermore, after configurable applications are distributed to end user systems, a user of application developer system 250 may define, using application identifiers, customer keys, user keys, etc. which treatments are to be applied to which features in configurable application 275. Furthermore, a user of application developer system 250 may specify an experiment (e.g., define user groups and associated treatments, a timeframe for an experiment including start time and duration, one or more sets of metric values, etc.), and set up an orchestrated experiment (e.g., timed rollout of a feature to members of a user group or user class).

In one embodiment, monitoring GUI generator 214 further generates one or more user interface enabling application developer system 250 to define one or more set(s) of metrics to be monitored during experiments (e.g., feature and/or application rollout to specified users, user groups, etc.), a significance threshold applied to a metric and/or set of metrics, alert policies that define when alerts should be received on features causing metric degradation, suggestions for application configuration (e.g., feature rollback, feature updating to a control group, feature killing, etc.), and definition of when an automatic application configuration may occur. In an embodiment, GUI generator 214 transmits the GUI to a user of application developer system 250. Within the GUI, the user may configure metric(s) to be monitored by statistical analysis engine 212. For example, a user may define tiers of metrics, such as a tier of key metrics of particular interest to the developer, a tier of metrics that are of interest but maybe not as important as the key metrics, as well as any other tiers with a collection of two or more metrics. Furthermore, the developer may define, via the GUI, a significance threshold to be applied to each metric tier and/or metric, which defines an amount or percentage that may be attributable to a falsely attributed result (e.g., a p-value used in null hypothesis testing of a feature treatment impact on a metric). There is a trade-off with respect to this value, such that a significance threshold set too high (e.g., 25%, or a p-value of 0.25) will result in too many falsely attributed statistically significant impacts to metrics by a feature treatment, but statistical analysis will arrive at the determination more efficiently. In contrast, a significance threshold set too low (e.g., 0.5%, or a p value of 0.005) will avoid the false attribution noted above, but will take longer to determine statistical significance of results. Thus, in embodiments, the significance level of metric tiers is configurable by a user, and in embodiments, is set to a default of 5% (or a p-value of 0.05). Furthermore, the number of metrics in a multiple comparison correction impacts how the adjustments impact the metrics, typically by reducing p-value per metric to ensure an overall error rate. Thus, in embodiments, key metric tiers of a limited number of metrics (e.g., 2, 5, 10, etc. key metrics) may be defined to ensure timely statistical significance determination, as well as reduced p-value adjustment.

Additional experiment parameters may be configured by the GUI of monitoring GUI generator 214, such as the desired direction of metric (e.g., a page load time should decrease, which indicates to statistical analysis engine 212 that movement of the metric in the opposite direction (e.g. page load time increases) is an undesirable impact on the application), the traffic type to measure (e.g., users, specific user groups, operating systems, device types, etc.), how the metric is measured (e.g., page load times measured in time increments, memory usage measured in byte or megabytes, etc.). Additional configurations, such as configuring the value used in metric measurement may also be specified (e.g., default, a specific value type, a range of values, etc.). As discussed herein, various metrics, metric types, and metric tiers (e.g., event occurrence counts, time on page, page or application error counts, etc., and their grouping into different tiers) may be configured via interfaces generated by monitoring GUI generator 212, similar to the discussion above, and subsequently metrics collected by application monitoring and configuration server.

For a metric being configured, monitoring GUI generator 214 may also generate an alerts policy user interface. The alerts policy interface enables a user of developer system 250 to define how an alerts policy is configured, such as enabling the naming and describing of a policy, enabling the definition of when a statistically relevant degradation of a metric is detected, and who are the user(s) associated with developer system (e.g., developer(s) associated with the configurable application 275, developer(s) associated with a feature associated with the metric, developers that manage the metric, specific user groups, etc.) that should receive notifications in response to the analysis described herein. In an embodiment, an alert policy may be defined for each metric or metric tier configured by a user, by specifying a name of the policy, an optional description of the alert policy, and various alerting conditions. The alerting conditions enable the specification of where an alert should be generated, the alerting threshold being monitored for a metric (e.g., the size of the degradation being monitored, such as for a page load time metric, an alert condition may specify an alert/automatic configuration should be activated when a relative degradation size (e.g., page load time increased by 20%) or absolute degradation (e.g., page load time increased by 100 ms) of the metric value is detected), and the alertees (e.g., metric owners, treatment owners, other users/user groups, additional emails, etc.). Furthermore, additional alert conditions may be specified for the metric, as well as other metrics and/or metric tiers. In one embodiment, not only is degradation of a specific size (e.g. an alerting threshold), but an additional level of confidence required to declare statistical significance is configured for each alert policy, such as a 90%, 95%, 99%, etc. likely that a detected degradation can be attributed to a treatment (discussed in greater detail below), or put another way a 10%, 5%, 1% chance that the detected degradation meeting the threshold amount is incorrectly attributed.

In one embodiment, the additional alert condition(s) may include automatic application configuration conditions, which are configurable by a user of a developer system as discussed above by defining a name, description (optional), and the conditions associated with automatic configuration. In embodiments, for example, a larger alert threshold associated with a larger degradation size may be specified for automatic configuration (e.g., alert messages generated at 5% degradation, and feature rollback/killing performed at 20% degradation), a time period upon which an alert message should be handled before feature rollback/killing (e.g., in response to sending alert notification, if not dismissed within 24 hours, rollback/kill the feature), as well as other conditions for automatic application configuration. In embodiments, statistical significance may also be configured for taking automatic actions, such as when it is 90% likely that a metric degradation is correct an alert is generated, but when it is 99% likely that a metric degradation is correct an automatic re-configuration is performed. In embodiments, a combination of different alerting thresholds and confidence levels could be used for alert notifications and automatic application re-configurations. The alert policy(s) may then be created, which are stored by application monitoring and configuration server 210 within user data store 216, and later used by statistical analysis engine 212, as discussed in greater detail below.

In one embodiment, event tracking API manager and interface 240 of application monitoring and configuration server 210 may receive event messages on an ongoing basis, and store the relevant data (e.g., customer key, user key, event type, value, timestamp, etc.) in user data store 216. Then, based on experiment parameters defined by application developer system 250, application treatment interface 230 may distribute feature treatments to associated user(s)/group(s) (e.g., users in a specific region have a specific treatment applied, users of a certain age have a specific treatment applied, users with certain device types may have a specific treatment applied, etc.), and collects event messages. Experiment and event attribution engine 220 then accesses the user data store to obtain event message data associated with the customer key and user key (e.g., event messages associated with application developer system 250, and the end users of that developer including end user system 270).

As discussed below, experiment and event attribution engine 220 may perform event attribution for some events, exclude some users from an experiment, update a version of an experiment, and set a window of time for the experiment (e.g., automatically or based on application developer system input). As discussed herein, application monitoring and configuration server 210 is able to consume event data from any source (e.g., one or more end user systems, external application developer system(s), etc.) so long as the event captured in an event message can be associated with a customer key, traffic/user key, and timestamp. Thus, application monitoring and configuration server 210 allows application developer system(s) and configurable applications to send application monitoring and configuration server 210 data from any source, for automatically identifying the sample population of an experiment, application deployment, etc., and using experiment and event attribution engine 220 to intelligently attribute events to each sample based on targeting rule (e.g., how a user is identified for a treatment) and treatment (e.g., application of the treatment to the identified user).

In embodiments, experiment and event attribution engine 220 combines received event data with the user keys to determine whether the event may have been influenced by a treatment applied to configurable application 275, based on whether the event occurred after the end user system was exposed to the treatment. Furthermore, the event messages, as discussed herein, may include a value associated with an event type that is relevant to the metrics defined by a developer for the event type (e.g., an impact of a particular treatment) compared to a baseline treatment (e.g., values from event messages from another subset of users, for example, those without the treatment applied or a different treatment applied). Experiment and event attribution engine 220 then attributes metrics and associated metric values to feature treatments from the event messages in user data store 216, where event attribution is described more fully in U.S. patent application Ser. No. 16/681,207, titled "Systems and Methods for Providing Event Attribution in Software Applications", file on Nov. 12, 2019, which is incorporated herein by reference in its entirety.

In embodiments, based on the attribution discussed above, experiment and event attribution engine 220 stores the attribution of event messages to treatments, and the metric values reported in those event messages, in user data store 216 for experiments analysis, GUI generation, application rollout, etc. Statistical analysis engine 212 accesses the data store to perform a statistical analysis of the metrics and metric values to detect statistically significant impact on metrics by a threshold amount (e.g., the significance threshold defined by the developer) caused by feature treatment(s) in an experiment In one embodiment, statistical analysis engine 212 correlates the metrics from defined user groups to the treatments they have received via the analysis by event attribution engine 220. For example, statistical analysis engine 212 is able to determine which users received a treatment change (e.g. an experiment population, a rollout population, etc.), and which did not (e.g. control users or control population). Then, statistically consistent sets of users (e.g., groups sharing similar characteristics) may be compared during metric analysis to determine impact of the treatment change, such as users with corresponding demographic information (e.g., age, geography, user device type, operating system, or other demographic information) and which were exposed to treatment variations of a feature for which the metric is being collected. In other words, an apples to apples comparison is being performed by statistical analysis engine 212 to obtain relevant metric value analysis results.

In one embodiment, statistical analysis engine 212 performs a statistical analysis to detect the degradation, improvement, or both of a metric (e.g., page load time) by a certain amount (e.g., the alerting threshold configured by a user system) in a population such that the degradation and/or improvement is statistically likely to have occurred as a result of a feature treatment. For example, the developer defined confidence (90%, 95%, 99%, etc.) discussed above indicates in the statistical analysis that a detected statistically significant metric value change is at most 10%, 5%, 1%, etc. likely attributable to an incorrect conclusion. In statistical analysis terms, for the test performed by the statistical analysis engine, a null hypothesis being tested is that the metric is within the threshold set by the developer system, an alternative hypothesis is that the metric exceeds the threshold, and a maximum acceptable error rate is set as the 10%, 5%, 1%, etc. value when disproving the null hypothesis. In embodiments, the test may be performed by the statistical analysis engine 212 in a direction of metric degradation (e.g., as defined by a developer) because degradation generally matters for alerting purposes in one direction (e.g., page load time decreasing is a good result of a feature treatment, and page load time increasing is a negative result of a feature treatment for which alerts and application configuration should be performed to avoid negative end-user experiences). However, in embodiments, the test may also be performed by the statistical analysis engine 212 in a direction of metric improvement, or both improvement and degradation. Furthermore, in embodiments, statistical analysis engine 212 uses a one-tailed test when detecting movement of a metric in a single direction because the statistical significance of the degradation (e.g. movement in a specific direction) is detectable sooner than a two-tailed test, leading to faster application anomaly detection, alerting, and remediation, thereby reducing a total number of end users exposed to a poorly performing treatment variation before alerting and automatic configurations may be performed. Furthermore, specific type(s) of statistical tests performed by statistical analysis engine 212 can depend on the characteristics of the metric(s) being evaluated. For example, for continuous valued metrics (e.g., event occurrence counts, time on page, page or application error counts, etc.) where it is determined appropriate to assume normally distributed errors, a specific test used by statistical analysis engine 212 may be a t-test. For metrics measuring whether or not a particular event occurred (e.g., the proportion of users who saw a particular error, the proportion of users who made a purchase, etc.) where the metric can be assumed to follow a binomial distribution, the specific test used by statistical analysis engine 212 may be a z-test. In one embodiment, when it is not possible to make any assumptions about the distribution of the metric, a non-parametric test (e.g., Mann-Whitney U test) may be used.

In embodiments, the developer system 250 is able to configure the parameters of the test performed by statistical analysis engine 212. That is, the confidence threshold value defined by the customer, in embodiments, is used by the statistical analysis engine 212 to configure the p-value threshold for the test (e.g., developer defined confidence of 95% sets a p-value threshold in the test of 0.05 giving a type one error rate, which is the chance of falsely rejecting the null hypothesis, of 5%). Then, for the test, the statistical analysis engine can set a null hypothesis as impact not satisfying a user defined threshold (e.g., page load time attributed to a treatment variation is the same or less than baseline page load time and/or page load time with an absolute or relative degradation amount equal to the developer defined acceptable threshold), an alternative hypothesis is set as the metric exceeding the threshold defined by a developer and optionally in a defined direction of degradation. Then statistical analysis engine is able to determine when a statistically significant impact on a metric occurs as a result of feature treatment during an experiment, as well as when automatic actions are to be taken, by disproving the null hypothesis with a chance of error no more than the p-value threshold. That is, for a given metric, significance, an alert, and/or an automatic application configuration is performed when statistically significant metric impact is detected, and the impact is statistically unlikely to be incorrectly attributed (e.g., no more than 5% chance that the detected impact is attributable incorrectly to the treatment).

Furthermore, in embodiments and because multiple metrics are collected/measured simultaneously during an experiment involving feature treatment(s), statistical analysis engine 212 performs multiple comparison correction on the statistical analysis results. That is, as discussed herein, when multiple metric values are measured during the same experiment (e.g., for a specific feature treatment change), the likelihood of falsely attributing a statistically significant impact to metric(s) by a feature treatment increases, and potentially to an unacceptable level. Therefore, in embodiments statistical analysis engine 212 performs multiple comparison correction using a false discovery rate control process. The false discovery rate control process controls the expected proportion of discoveries (e.g., rejected null hypotheses) that are false (e.g., incorrectly rejected). More specifically, the false discovery rate control process used by the statistical analysis engine 212 is a Benjamini-Hochberg, Benjamini-Yekutieli, or other control process as discussed herein that analyzes the group of metric values analyses, determines an adjustment factor indicating how p-values, or p-value thresholds, should be adjusted for each metric value analysis (e.g., original p-value should be adjusted by X %, multiplied by a value of Y, etc.), adjusts testing parameters of each metric using the factor (e.g., adjusts associated p-values, and accordingly error margins and confidence intervals based on the p-value adjustment), and re-performs the statistical analysis using the adjusted testing parameters. The adjustment and analysis may be user selectable (e.g., via GUI generated by generator 214), which enables a user to select which metric sets/tiers MCC is applied to. By using the adjusted testing parameters, the accumulated error among all discoveries, or the false discovery rate, is ensured not to exceed the original significance threshold set by a user of application developer system 250. Beneficially, the ultimate results' accuracy in feature deployment testing at distributed applications is increased so that developers can rely on the detection of significance of feature treatment impact on metrics when, for example, rolling out feature treatments to additional users, revising code to adjust feature treatment execution, rolling back features, etc. Furthermore, by accurately detecting feature treatments that improve application performance, application characteristics such as memory usage, network bandwidth usage, processing resource usage, user experience, etc. can be improved.

Furthermore, in embodiments, statistical analysis engine 212 performs periodic analysis of the event data in user data store 216. In embodiments, an initial analysis is performed at time $t_1$, then at time $t_2$, and so on to time $t_n$. In embodiments, the MCC performed by statistical analysis engine is re-performed at each time interval as the false discovery rate control process is applied to specific testing results for a given time interval to determine associated adjustment factors. In embodiments, the MCC performed by the statistical analysis engine is performed both across metrics for a given time interval (e.g., to correct for accumulated error when multiple metrics are simultaneously collected during feature treatment experimentation), as well as over time intervals for the same metric (e.g., testing parameters for metric M1 are adjusted by MCC applied over successive time intervals to correct the accumulated error for that metric as a result of multiple measurements over time). In an embodiment, MCC is applied by statistical analysis engine 212 to metrics over time before then being applied to set(s) of metrics during a specific time interval.

Additionally, the time based approach enables statistical analysis engine 212 to exclude metrics from MCC when there is an insufficient number of observations (e.g., 100 observations, 300 observations, 500 observations, 2,000 observations, etc. or other predetermined observation sufficiency threshold value) for a given metric. That is one or more metrics can be excluded from MCC by statistical analysis engine 212 at a certain point in time (Ti) because each of the excluded metrics does not have a sufficient number of observations satisfying the observation sufficiency threshold value. Thus, in embodiments a multiple comparison correction procedure is applied to metrics satisfying the observation sufficiency threshold value to ensure that sufficient statistical significance can be determined for those metrics. Furthermore, because the magnitude of correction applied by MCC, and thus adjustment to original testing parameters, depends on the number of metrics to which MCC is applied to, the exclusion of metrics by the statistical analysis engine 212 ensures that the MCC changes made to metrics' testing parameters are minimized. Thus, the adjustments determined by the false discovery rate control process of the MCC may be different each time $t_i$ it is performed forming a time-series of MCC adjusted metric analysis, and the magnitude of those parameter adjustments minimized while ensuring statistical analysis accuracy across metrics.

Monitoring GUI generator 214 may then present experiment results indicating impacts on metrics, such as indicating metrics that have been significantly impacted by a feature treatment defined for an experiment, how tiers of metrics have been impacted, impacts and MCC corrections over time, etc. Furthermore, the application of MCC may be indicated within the GUI to signal to a user of developer system that correction was performed, and thus, the results are ensured to the user's originally defined significance threshold value(s).

Furthermore, upon detecting a metric has changed by an amount that satisfies an alerting/configuration threshold with a statistically significant likelihood, notification and action engine 242 is informed to generate one or more alerts based on the alerting policies. In one embodiment, the alerts may be embodied in test, email, voice, commercial instant messaging system, commercial social network system, or other message(s) generated by monitoring GUI generator 214 that identifies the feature, treatment, threshold, degradation amount, degradation percentage, detection time, likelihood of error etc. Furthermore, the email, instant message, etc. may contain a link to a graphical user interface served by application monitoring and configuration server 210.

Furthermore, and as discussed herein, action engine 242 may also utilize the statistical analysis adjusted using MCC and one or more automatic action rules to automatically adjust configurations of configurable applications at end user's systems (e.g., end user system 270). For example, in response to detecting a metric degradation satisfying an automatic action threshold (e.g., defined by a user of a developer system or a default of server 210), notification and action engine may automatically cause application treatment interface to reconfigure a misbehaving treatment (e.g., the treatment determined to be causing a metric degradation). The automatic configuration, when made, may be done to revert an application feature treatment variation to a prior state, a baseline configuration, or other safe configuration. In embodiments, a rule with which action engine 242 automatically configures an application with a safe (baseline) treatment based on statistical significance of metric degradation determination can be defined by application developer system 250.

In embodiments, the execution and performance by the remote end user systems (e.g., end user system 270) is improved with respect to metric of interest as defined by developer systems 250. More specifically, the statistical analysis performed with adjustments for multiple comparison correction by application monitoring and configuration server 210 enables the improved detection of metric impact satisfying a developer set threshold with a statistical significance that the degradation is not being wrongly attributed to an incorrect determination. This determination by the statistical analysis engine is performed on statistically relevant populations, and not merely an aggregation of results across all users to ensure fast, more accurate, granular, feature level degradation determinations. This in turn enables faster notifications and automatic application configurations, which ensures less end users are exposed to underperforming feature variations.

Figure 3:
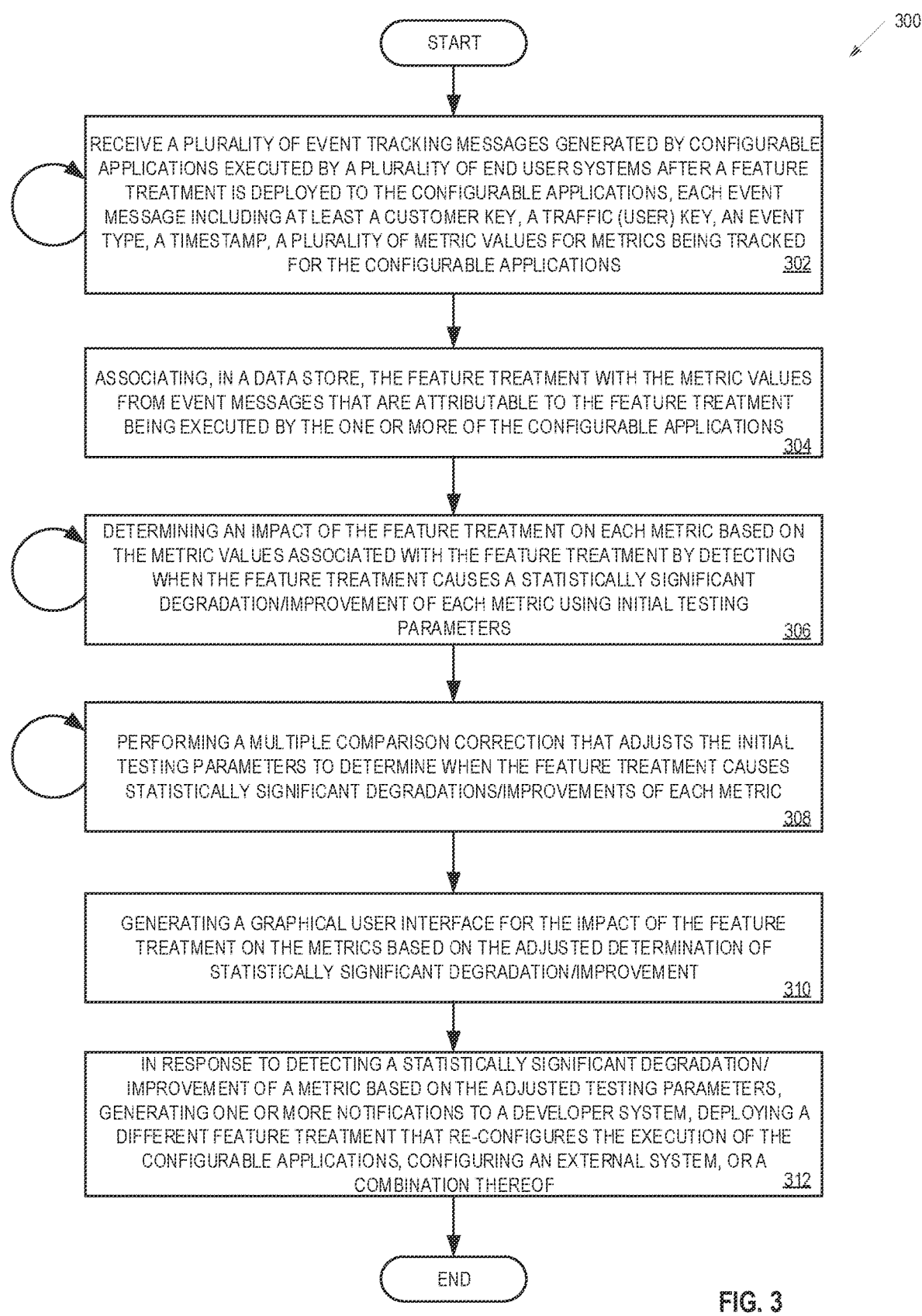
FIG. 3 is a flow diagram of one embodiment of a method for performing multiple comparison correction during configurable application feature experimentation.

FIG. 3 is a flow diagram of one embodiment of a method 300 for performing multiple comparison correction during configurable application feature experimentation. The method 300 is performed by processing logic that may comprise hardware (circuitry, dedicated logic, etc.), software (such as is run on a general purpose computer system or a dedicated machine), firmware, or a combination. In one embodiment, the method 300 is performed by an application monitoring and configuration server (e.g., application monitoring and configuration server 110, 210, or 310).

Referring to FIG. 3, processing logic begins by receiving a plurality of event tracking messages generated by configurable applications executed by a plurality of end user systems after a feature treatment is deployed to the configurable applications, where each event message includes at least a customer key, traffic (user) key, an event type, a timestamp, and a plurality of metric values of metrics being tracked for the configurable applications (processing block 302). In embodiments, the event tracking messages are generated within an application (e.g. API-based messaging, SDK track( ) method calls, etc.), to report metrics and values associated with the tracking. Processing logic continues to receive these reporting messages each time an application is exposed to a feature, uses a feature, etc. as configured by a developer for reporting feature exposure, usage, and/or metrics of interest to the developer. For example, in embodiments, the tracking messages may be placed behind configurable features as well as in other locations in applications, so that tracking messages indicate exposure to such features (e.g. a metric being the number of times an end user is exposed to the feature), a metric value generated for tracking purposes (e.g. a time on page value, a page load time value, click counts, etc.), or a combination of such metrics generated in one or more tracking messages generated from various location(s) in an application.

Processing logic then associates, in a data store, the feature treatment with metric values from event messages that are attributable to the feature treatment being executed by the one or more configurable applications (processing block 304). For example, based on data within the messages, time of message generation, user key, customer key, a time when a configuration, rollout, or experiment occurs, or a combination of such features etc., processing logic attributes an event tracking message, and thus the metric values within the message, to feature treatment variations. Processing logic then determines an impact of the feature treatment on each metric based on the metric values associated with the feature treatment by detecting when the feature treatment causes a statistically significant degradation/improvement of the metric using initial testing parameters (processing block 306). As discussed above, processing logic performs a statistical analysis of metrics from tracking messages in a population that was exposed to a treatment variation and a statistically consistent population that was not exposed to a treatment variation (e.g., a control group having one or more of the same demographic traits). Then, the metrics reported in the tracking messages are used during, for example, a statistical analysis (e.g., t-test, z-test, one-tailed test, etc.) test to determine with statistical significance when the metric value(s) associated and attributed to a feature treatment variation are statistically likely to have degraded or improved by a threshold amount as a result of the feature treatment. Furthermore, the statistical analysis is performed using user-defined parameters configured by a developer of the application for which the analysis is being performed. For example, processing logic may utilize a set of tiers of metrics defined by the developer (e.g., a set of page load time, click count total, average time on page per visit, etc.), optionally a desired impact on the metric such as a desired movement direction (e.g. direction of degradation or direction of improvement indicative of a feature treatment having an unwanted or desired impact on the configurable application), optionally an alerting/action threshold (e.g., an acceptable amount that a metric can move in a direction of degradation or improvement, such as a relative amount or an absolute amount, for example X+10% or X+100 ms respectively before an action is taken), a confidence level (e.g., 90%, 95%, 99%, etc. confidence, or a p-value of 0.1, 0.05, 0.01, etc. that a developer is agreeable to false attribution of metric impact), as well as default values associated with baseline values (e.g. from baseline treatments) or developer defined default values for such metrics.

Processing logic then uses the configurations when performing a statistical analysis. For example, a null hypothesis may be set for each metric within the configured threshold value, the alternative hypothesis may be set to the metric value satisfying or exceeding the threshold value in the direction of degradation or improvement (e.g., degradation satisfying the configured threshold or improvement satisfying the configured threshold), and the p-value for the statistical test being 10%, 5%, 1%, etc. corresponding to the configured confidence level. Processing logic then analyzes the metrics from the attributed events for the different populations to determine when the null hypothesis can be disproved within the configured confidence level.

Processing logic then performs a multiple comparison correction that adjusts testing parameters to determine when the feature treatment causes statistically significant degradation/improvement of each metric (processing block 308). The multiple comparison correction performed by processing logic uses a false discovery rate control process, such as the Benjamini-Hochberg, Benjamini-Yekutieli, or other control process as discussed herein that looks at the collective results of the analysis of block 306, and determines adjustment factors for the p-values of each metric using the false discovery rate control process. The adjustment of each p-value ensures that the collective error (e.g., likelihood of falsely attributing a statistically significant impact to any metric by a feature treatment) of those metrics which have been deemed statistically significant does not exceed a developer's originally defined confidence threshold. Furthermore, additional testing parameters, such as error margins and confidence intervals are also adjusted by the adjustment factor to reflect the adjustment to the p-value. Furthermore, the correction performed by processing logic is repeated for each time period that feature treatment data is collected for, as each set of collected data is different causing the adjustments to be different. For example, metrics may be collected to measure feature treatment variations (e.g., 3 versions of a feature, such as A, B, and C), and analysis compares the versions against one another (e.g., A v. B, A v. C, B v. C). Then, at a point in time, processing logic would determine and perform adjustments to testing parameters of each treatment pair comparison (e.g., correction factor applied to A v. B would be different than that applied to A v. C).

Additionally, processing logic may limit what metrics are used for performing multiple comparison correction. In an embodiment, certain metrics are considered to be testable when the metric is associated with a minimum number of reported metric values. The minimum number of reported metric value measurements, such as 355, 1000, a user defined minimum, etc. reported measurements, is selected as a minimum to ensure a sufficient sample size for a robust adjustment of analysis parameters. That is, a metric with insufficient samples may not result in as accurate of an adjustment to the collective parameters, and is excluded from analysis until the minimum sample size is achieved.

Processing logic then generates a graphical user interface for the impact of the feature treatment on the metrics based on the adjusted determination of statistically significant degradation/improvement (processing block 310). That is, the GUI generated and transmitted to a developer is indicative of which metrics did and did not move in a statistically significant way based on a feature treatment, over time, and with an error no greater than an original developer defined error. Thus, the indications of statistically significant metric impacts are ensured to be accurate by the developer. Furthermore, the graphical user interface may also render an icon, link, graphic, etc. to indicate to the developer that multiple comparison correction was performed.

Processing logic, in response to detecting the statistically significant degradation or improvement of the metric based on the adjusted testing parameters, generates one or more notifications to a developer system, deploys a different feature treatment that re-configures the execution of the configurable applications, configures an external system, or a combination thereof (processing block 308). In embodiments, the notification may be an email message, instant message, text message, voice message, or other alert message that includes information about the alert, such as metric to which the alert belongs, degradation amount detected, when the degradation was detected, etc. Furthermore, the alert message may link to a webpage or other user interface to be configured by processing logic. For example, the webpage or other user interface may display relevant information for deciding how to respond to the alert, such as impact on a metric, comparison to a control group, error margin, etc. Additionally, such automatic actions are taken based on statistical analysis using adjusted testing parameters to ensure that such actions are not taken outside of the developer defined confidence threshold.

Figure 4:
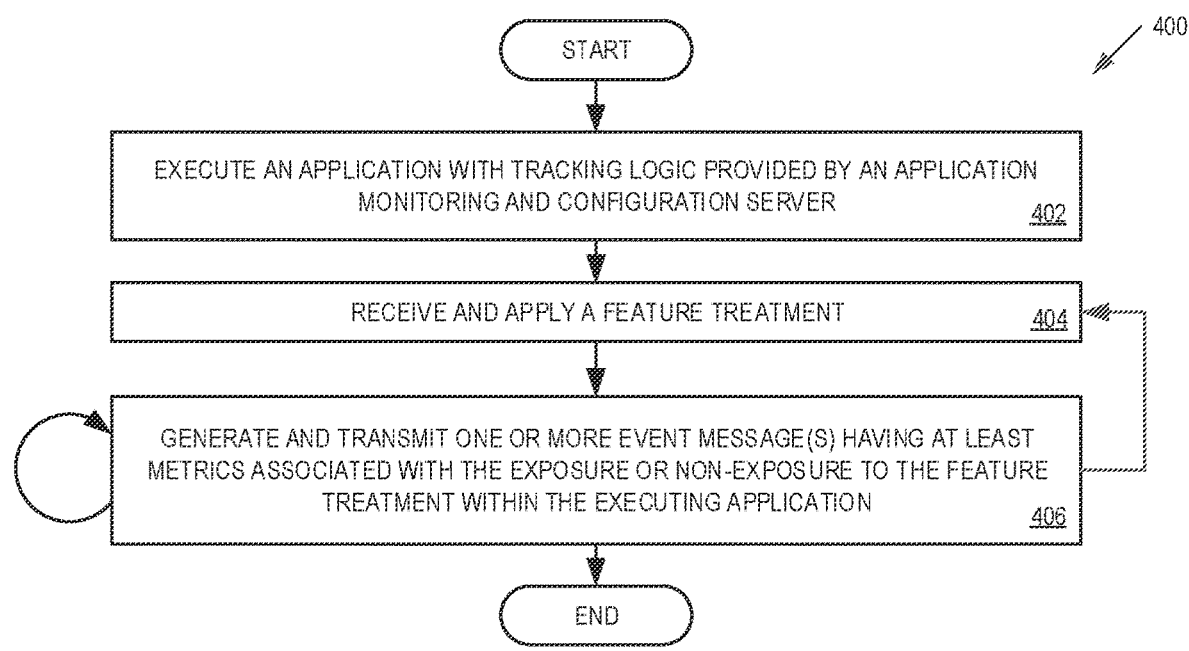
FIG. 4 is a flow diagram of one embodiment of a method for providing event messages from an application to an application monitoring and configuration server.

FIG. 4 is a flow diagram of one embodiment of a method 400 for providing event messages from an application to an application monitoring and configuration server. The method 400 is performed by processing logic that may comprise hardware (circuitry, dedicated logic, etc.), software (such as is run on a general purpose computer system or a dedicated machine), firmware, or a combination. In one embodiment, the method 400 may be performed by a configurable application running on a user system, such as configurable application 135-1 through 135-N and 275.

Referring to FIG. 4, processing logic begins by executing an application with tracking logic provided by an application monitoring and configuration server (processing block 402). For example, application monitoring and configuration server 110 or 210 may provide an API, SDK, etc. to an application developer system (e.g., application developer system 120 or 250), which integrates tracking method calls within relevant portions of one or more software applications to be tracked. For example, the tracking calls may be integrated into application features treatments, where specific treatments are conditionally executed within the configurable application. As another example, tracking calls maybe integrated into other software systems, such as membership systems, CRM systems, etc. that are relevant to a feature treatment that is the subject of an experiment. In yet another example, tracking calls may be integrated into several systems, that are part of configurable applications and external systems, where the track calls are integrated into features of relevant that are related to configurable application feature application and application developer system 250 objectives Processing logic receives and applies a feature treatment (processing block 404). For example, processing logic may receive treatments from an application monitoring and configuration server (110 or 210) specifying what feature, treatment values, etc. are to be applied by the application tracking logic.

Processing logic then generates and transmits one or more event messages having at least metrics associated with the exposure or non-exposure to the feature treatment within the executing application (processing block 406). In one embodiment, event messages are generated by executing a tracking method call (e.g. track(customer_ID, traffic_ID, event-ID, metric value, and a timestamp). The date contained within the track( ) call and transmitted by processing logic to application monitoring and configuration server indicates that a feature of interest within an application or external system was accessed by a user of an end user system. Then, when the data, such as customer ID, traffic/user ID, metric value, event type, timestamps, etc. are attributed to feature deployment and/or rollout based on timing, as discussed above, rich and feature full insights are gained as to whether a treatment applied to a configurable application used by one or more users (e.g., those specified in an experiment rule), and statistical analysis with multiple comparison correction can be performed to determine to a statistical significance when a feature is having a positive and/or negative impact on an application. Then, the application monitoring and configuration server may take appropriate actions, such as generating notifications, automatically configuring an application, or a combination thereof as discussed herein.

Figure 5:
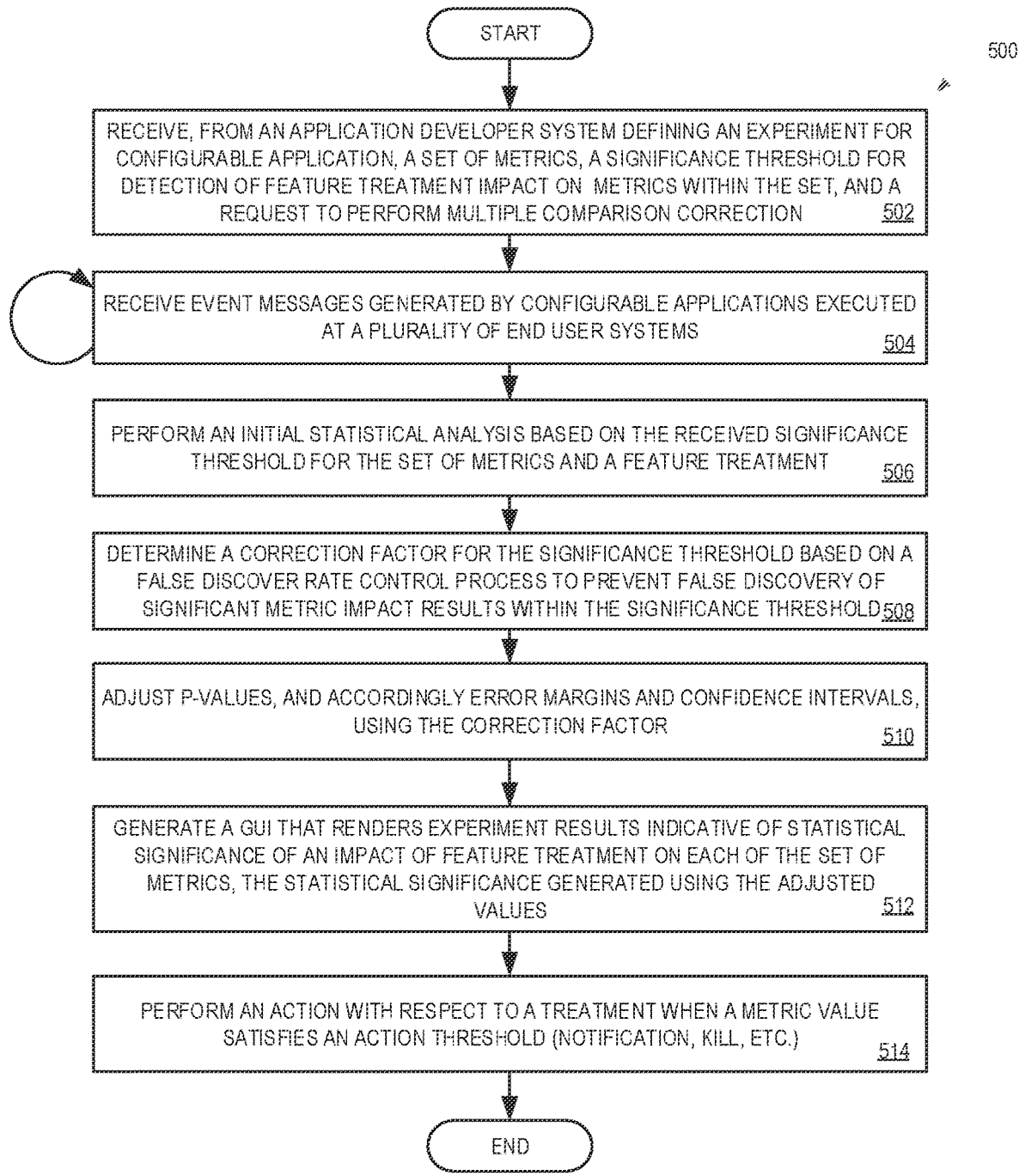
FIG. 5 is a flow diagram of one embodiment of a method for an application monitoring and configuration server enabling multiple comparison correction during configurable application feature experimentation.

FIG. 5 is a flow diagram of one embodiment of a method 500 for an application monitoring and configuration server enabling multiple comparison correction during configurable application feature experimentation. The method 500 is performed by processing logic that may comprise hardware (circuitry, dedicated logic, etc.), software (such as is run on a general purpose computer system or a dedicated machine), firmware, or a combination. In one embodiment, the method 500 is performed by an application monitoring and configuration server (e.g., application monitoring and configuration server 110, 210, or 310).

Referring to FIG. 5, processing logic begins by, receiving, from an application developer system, a set of metrics, a significance threshold for detection of feature treatment impact on one or more metrics within the set, and a request to perform multiple comparison correction when performing feature treatment impact analysis (processing block 502). The set of metrics may define tiers of metrics, such as key performance indicator metrics, a larger set of metrics of interest, or other sets/tiers. Furthermore, in embodiments, the significance threshold received may include a single threshold applied to all metrics within a set, or may be a set of thresholds that each apply to a different metric. Additionally, a default confidence threshold set by an application monitoring system may also be used. As discussed above, these confidence threshold(s) form p-value(s) in statistical analysis testing, and are adjusted based on the false discovery rate control process performed during multiple comparison correction.

Processing logic then receives event messages generated by configurable applications (processing block 504). These may be received periodically over time, and thus the values of metrics may change in the messages indicating evolving impact of feature treatment on one or more metrics and metric values.

Processing logic performs an initial statistical analysis based on the received significance threshold for the set of metrics and a feature treatment (processing block 506). As indicated above, the initial statistical analysis is not the final analysis, as the capture and analysis of multiple metrics/values simultaneously results in the accumulation of error beyond that defined by a developer system. For example, an initial confidence level (of falsely attributing feature impact on a metric) may be set to 0.05 for each metric, but the accumulated error will be higher when there are multiple metrics. Because this resulting accumulated error rate is not acceptable, processing logic determines a correction factor for the significance threshold, or alternatively a correction factor for the individual metrics' p-values, based on a false discovery rate control process to prevent false discovery of significant metric impact results within the significance threshold (processing block 508). The correction factor, as discussed herein is a change to the p-value of a metric, such as adjustment by X %, a constant multiplier of an original p-value, etc.

Processing logic uses the correction factor to then adjust p-values, and accordingly error margins and confidence intervals, using the correction factor (processing block 510). In other words, the correction factor is applied to various testing parameters associated with each metric and p-value adjustment ensuring that an accumulated error due to multiple simultaneous comparison of feature treatment impact on metrics does not exceed a user defined confidence threshold. Processing logic is then able to generate a graphical user interface (GUI) that renders experiment results indicative of statistical significance of an impact of feature treatment on each of the set of metrics, where the statistical significance is generated using the adjusted values (processing block 512).

Optionally, and in embodiments, processing logic further performs an action with respect to a treatment when a metric value satisfies an action threshold (processing block 514). For example, processing logic when detecting that a feature causes a statistically significant change to one or more metrics within a set of metrics, where the change is predefined as being associated with an automatic action, processing logic performs the action (e.g., reverting a feature, stopping the feature, further deploying the feature, etc.).

Figure 6:
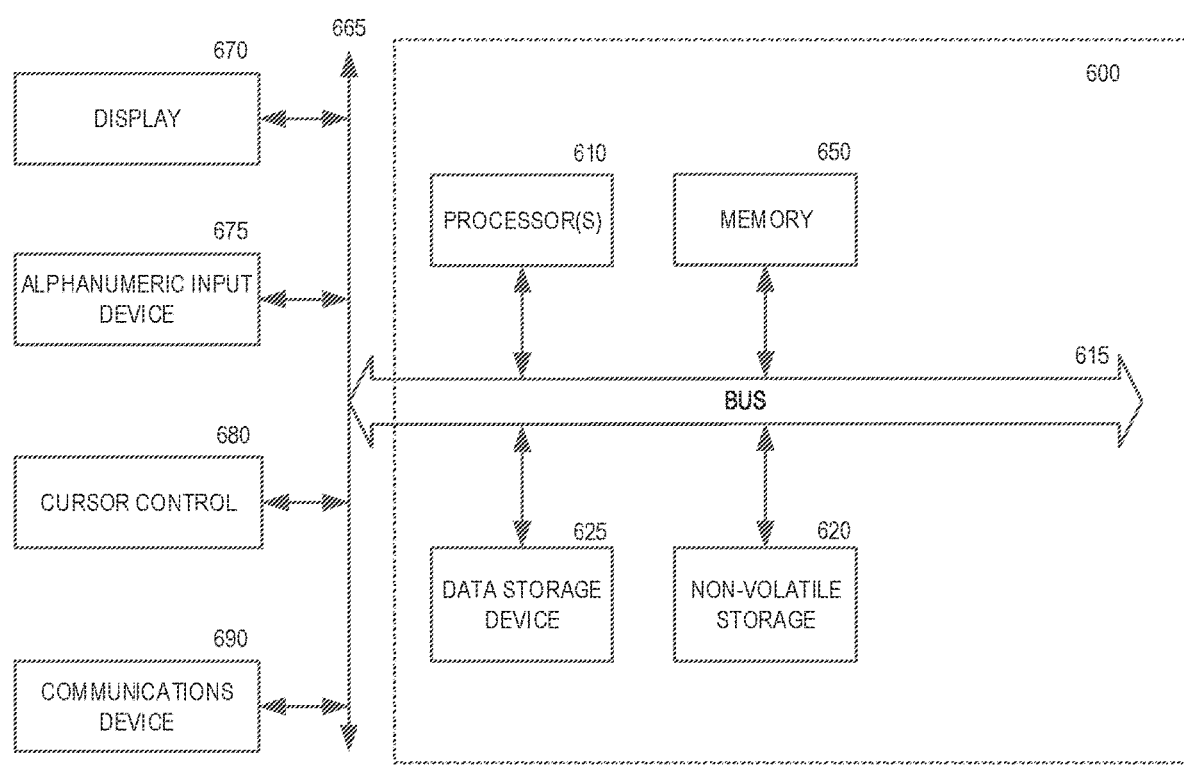
FIG. 6 is one embodiment of a computer system that may be used in accordance with an embodiment of the invention.

FIG. 6 is one embodiment of a computer system that may be used with the present invention, for example, to implement application monitoring and configuration server 110. It will be apparent to those of ordinary skill in the art, however that other alternative systems of various system architectures may also be used.

The data processing system illustrated in FIG. 6 includes a bus or other internal communication means 615 for communicating information, and at least one processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED), a liquid crystal display (LCD), or other display, coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a non-transitory computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method for configurable application feature experiments, comprising:
  receiving, by a computer server from an application developer system, a set of metrics to be collected after a feature treatment is deployed to configurable applications executed by a plurality of end user systems, a significance threshold for detection of feature treatment impact on one or more metrics within the set of metrics, and a request to perform multiple comparison correction when detecting the feature treatment impact;
  receiving, from the configurable applications executed by the plurality of end user systems, event messages generated by the configurable applications after deployment of the feature treatment, the event messages comprising metric values associated with the set of metrics;
  performing, by the computer server, a statistical analysis of the metric values to determine whether the feature treatment caused a statistically significant change in values associated with one or more of the metrics, wherein the statistical analysis comprises adjusting one or more parameters used to perform the statistical analysis based on a multiple comparison correction analysis;
  transmitting, by the computer server to the application developer system, a message indicating a statistical impact of the feature treatment on each of the metrics in the set of metrics.

2. The method of claim 1, where performing the statistical analysis of the metric values and adjusting one or more parameters used to perform the statistical analysis based on the multiple comparison correction analysis, further comprises:
  performing an initial statistical analysis of the metric values using a set of one or more statistical analysis parameters defined by a user of the application developer system;
  determining a set of one or more correction factors to be applied to the set of one or more statistical analysis parameters;
  adjusting each of the one or more statistical analysis parameters based on the corresponding correction factor; and
  performing a final statistical analysis of the metric values using the adjusted statistical analysis parameters.

3. The method of claim 2, wherein the set of one or more statistical analysis parameters comprises one or more p-values used in a statistical test of an impact of the feature treatment on the metric values, and each of the metrics is associated with a p-value.

4. The method of claim 3, wherein determining the correction factor comprises:
   performing a false discovery rate control process based on results of the initial statistical analysis of the metric values;
   determining adjustments to each of the p-values associated with each of the metrics;
   setting a correction factor for each metric based on the adjustment determined for the p-value associated with the metric; and
   adjusting each of the set of one or more statistical analysis parameters using the correction factors to generate sets of adjusted statistical analysis parameters.

5. The method of claim 3, wherein adjusting each of the one or more statistical analysis parameters based on the correction factor further comprises:
   adjusting, using the correction factor for each metric, an error margin and a confidence interval associated with said each metric.

6. The method of claim 2, wherein the multiple comparison correction analysis comprises a Benjamini-Hochberg false discovery rate control process, Benjamini-Yekutieli false discovery rate control process, Storey's q-value control process, a local false discovery rate control process, or a positive false discovery rate control process.

7. The method of claim 1, wherein adjustment of the one or more parameters used to perform the statistical analysis based on the multiple comparison correction analysis is based on a subset of metrics each having a minimum sample size of metric values reported by the configurable applications executed by the plurality of end user systems.

8. The method of claim 1, wherein the statistical analysis of the metric values is performed at periodic intervals to determine whether the feature treatment caused statistically significant changes in values associated with the one or more of the metrics at each of the periodic intervals, and the message indicating the statistical impact of the feature treatment on each of the metrics in the set of metrics comprises indications of statistical impact at each of the periodic intervals.

9. The method of claim 8, further comprising:
   determining, at a first time interval for each metric in the set of metrics, a number of metric value observations;
   excluding, at the first time interval, a first metric from the statistical analysis of the metric values when a first number of metric value observations associated with the first metric does not satisfy a threshold value; and
   performing, by the computer server at the first time interval, the statistical analysis of metric values associated with non-excluded metrics, wherein the statistical analysis comprises adjusting one or more parameters used to perform the statistical analysis of the non-excluded metrics at the first time interval based on a multiple comparison correction analysis.

10. The method of claim 9, further comprising:
    determining, at a second time interval for each metric in the set of metrics, a number of metric value observations;
    including, at the second time interval, the first metric in the statistical analysis of the metric values when a second number of metric value observations associated with the first metric satisfies the threshold value, wherein the second number of metric value observations is greater than the first number of metric value observations.

11. The method of claim 1, wherein the set of metrics comprises a selection of metrics from among a set of all metrics, the selected metrics forming a tier of metrics of interest to the application developer system.

12. The method of claim 1, further comprising:
    in response to detecting a statistically significant change in values associated with a select one of the one or more of the metrics, generating and transmitting one or more notifications to one or more users responsible for development of the configurable applications, deploying a different feature treatment that re-configures the execution of the configurable applications of end user systems that have the feature treatment, or a combination thereof.

13. A non-transitory computer readable storage medium including instructions that, when executed by a processor, cause the processor to perform operations for configurable application feature experiments, comprising:
    receiving, by a computer server from an application developer system, a set of metrics to be collected after a feature treatment is deployed to configurable applications executed by a plurality of end user systems, a significance threshold for detection of feature treatment impact on one or more metrics within the set of metrics, and a request to perform multiple comparison correction when detecting the feature treatment impact;
    receiving, from the configurable applications executed by the plurality of end user systems, event messages generated by the configurable applications after deployment of the feature treatment, the event messages comprising metric values associated with the set of metrics;
    performing, by the computer server, a statistical analysis of the metric values to determine whether the feature treatment caused a statistically significant change in values associated with one or more of the metrics, wherein the statistical analysis comprises adjusting one or more parameters used to perform the statistical analysis based on a multiple comparison correction analysis;
    transmitting, by the computer server to the application developer system, a message indicating a statistical impact of the feature treatment on each of the metrics in the set of metrics.

14. The non-transitory computer readable storage medium of claim 13, where performing the statistical analysis of the metric values and adjusting one or more parameters used to perform the statistical analysis based on the multiple comparison correction analysis, further comprises:
    performing an initial statistical analysis of the metric values using a set of one or more statistical analysis parameters defined by a user of the application developer system;
    determining a set of one or more correction factors to be applied to the set of one or more statistical analysis parameters;
    adjusting each of the one or more statistical analysis parameters based on the corresponding correction factor; and
    performing a final statistical analysis of the metric values using the adjusted statistical analysis parameters.

15. The non-transitory computer readable storage medium of claim 14, wherein the set of one or more statistical analysis parameters comprises one or more p-values used in a statistical test of an impact of the feature treatment on the metric values, and each of the metrics is associated with a p-value.

16. The non-transitory computer readable storage medium of claim 15, wherein determining the correction factor comprises:
 performing a false discovery rate control process based on results of the initial statistical analysis of the metric values;
 determining adjustments to each of the p-values associated with each of the metrics;
 setting a correction factor for each metric based on the adjustment determined for the p-value associated with the metric; and
 adjusting each of the set of one or more statistical analysis parameters using the correction factors to generate sets of adjusted statistical analysis parameters.

17. The non-transitory computer readable storage medium of claim 15, wherein adjusting each of the one or more statistical analysis parameters based on the correction factor further comprises:
 adjusting, using the correction factor for each metric, an error margin and a confidence interval associated with said each metric.

18. The non-transitory computer readable storage medium of claim 13, wherein adjustment of the one or more parameters used to perform the statistical analysis based on the multiple comparison correction analysis is based on a subset of metrics each having a minimum sample size of metric values reported by the configurable applications executed by the plurality of end user systems.

19. The non-transitory computer readable storage medium of claim 13, wherein the statistical analysis of the metric values is performed at periodic intervals to determine whether the feature treatment caused statistically significant changes in values associated with the one or more of the metrics at each of the periodic intervals, and the message indicating the statistical impact of the feature treatment on each of the metrics in the set of metrics comprises indications of statistical impact at each of the periodic intervals.

20. A system for configurable application feature experiments, comprising:
 a memory to store event messages; and
 a processing system coupled with the memory configured to:
  receive, from an application developer system, a set of metrics to be collected after a feature treatment is deployed to configurable applications executed by a plurality of end user systems, a significance threshold for detection of feature treatment impact on one or more metrics within the set of metrics, and a request to perform multiple comparison correction when detecting the feature treatment impact,
  receive, from the configurable applications executed by the plurality of end user systems, event messages generated by the configurable applications after deployment of the feature treatment, the event messages comprising metric values associated with the set of metrics,
  perform a statistical analysis of the metric values to determine whether the feature treatment caused a statistically significant change in values associated with one or more of the metrics, wherein the statistical analysis comprises adjusting one or more parameters used to perform the statistical analysis based on a multiple comparison correction analysis, and
  transmit, to the application developer system, a message indicating a statistical impact of the feature treatment on each of the metrics in the set of metrics.

* * * * *